US012581542B2

(12) United States Patent (10) Patent No.: US 12,581,542 B2
Yuan et al. (45) Date of Patent: Mar. 17, 2026

(54) CROSS-CARRIER RANDOM ACCESS CHANNEL TRANSMISSION TRIGGERING

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/029,238

(22) Filed: Jan. 17, 2025

(65) Prior Publication Data

US 2025/0168898 A1 May 22, 2025

Related U.S. Application Data

(63) Continuation of application No. PCT/CN2022/111631, filed on Aug. 11, 2022.

(51) Int. Cl.
| | |
|---|---|
| *H04W 74/08* | (2024.01) |
| *H04W 72/0453* | (2023.01) |
| *H04W 74/0833* | (2024.01) |
| *H04W 76/38* | (2018.01) |

(52) U.S. Cl.
CPC ... *H04W 74/0833* (2013.01); *H04W 72/0453* (2013.01); *H04W 76/38* (2018.02)

(58) Field of Classification Search
CPC ............. H04W 74/0833; H04W 76/38; H04W 72/0453
See application file for complete search history.

(56) References Cited

U.S. PATENT DOCUMENTS

| | | |
|---|---|---|
| 2017/0325219 A1 | 11/2017 | Zhang |
| 2019/0174384 A1* | 6/2019 | Kim .................. H04W 36/0061 |
| 2020/0351129 A1* | 11/2020 | Kwak .................... H04W 72/53 |
| 2021/0037607 A1 | 2/2021 | Hamidi-Sepehr et al. |
| 2021/0204344 A1* | 7/2021 | Babaei .................. H04W 80/02 |
| 2021/0345410 A1* | 11/2021 | Zhou ................. H04W 74/0833 |
| 2022/0124782 A1* | 4/2022 | Park ...................... H04W 72/23 |

(Continued)

FOREIGN PATENT DOCUMENTS

| | | |
|---|---|---|
| CN | 104168630 A | 11/2014 |
| CN | 111050373 A | 4/2020 |

(Continued)

OTHER PUBLICATIONS

CATT: "Discussion on Solutions for L1L2 Based Inter-Cell Mobility", 3GPP TSG-RAN WG2 Meeting #119-e, R2-2206993, Online, Aug. 17, 2022-Aug. 26, 2022, Aug. 10, 2022, pp. 1-7.

(Continued)

*Primary Examiner* — Brian D Nguyen
(74) *Attorney, Agent, or Firm* — Patterson + Sheridan, L.L.P.

(57) ABSTRACT

Certain aspects of the present disclosure provide a method of wireless communication by a user equipment (UE), generally including receiving signaling configuring the UE with a set of candidate cells, receiving, from a serving cell, downlink control information (DCI) indicating one candidate cell of the set of candidate cells as a target cell for transmitting a physical random access channel (PRACH), and transmitting the PRACH in the target cell.

28 Claims, 13 Drawing Sheets

(56) References Cited

U.S. PATENT DOCUMENTS

2022/0159710 A1* 5/2022 Xiao ................. H04W 74/0841
2022/0361202 A1* 11/2022 Yi ......................... H04W 24/10

FOREIGN PATENT DOCUMENTS

WO          2020021504 A1     1/2020
WO          2022052094 A1     3/2022

OTHER PUBLICATIONS

CMCC: "Initial Considerations on L1L2 Mobility", 3GPP TSG-RAN WG2 Meeting #119 electronic, R2-2208455, Online, Aug. 17, 2022-Aug. 29, 2022, Aug. 10, 2022, pp. 1-6.
International Search Report and Written Opinion—PCT/CN2022/111631—ISA/EPO—Apr. 23, 2023.
VIVO: "Views on Two TAs for Multi-DCI-based Multi-TRP Operation", 3GPP TSG RAN WG1 #109-e, R1-2203542, e-Meeting, May 9, 2022-May 20, 2022, Apr. 29, 2022, 6 Pages.

* cited by examiner

Assumption 1: Single PCell change without CA

Pre-configured candidate PCell set

Assumption 2: Individual PCell/SCell change in CA

Pre-configured candidate PCell set

Assumption 3: Cell group change in CA

A method of wireless communication by a UE

Receive signaling configuring the UE with a set of candidate cells

1005

Receive, from a serving cell, DCI indicating one of the candidate cells as a target cell for transmitting a PRACH

1010

Transmit the PRACH in the target cell

1015

1000

A method of wireless communication by a network entity

Transmit signaling configuring a UE with a set of candidate cells ⌐1105

Transmit DCI indicating one of the candidate cells as a target cell for the UE to transmit a PRACH ⌐1110

1100

CROSS-CARRIER RANDOM ACCESS CHANNEL TRANSMISSION TRIGGERING

CROSS-REFERENCE TO RELATED APPLICATIONS

This application is a continuation of International Patent Application No. PCT/CN2022/111631, filed Aug. 11, 2022, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for cross-carrier random access channel triggering.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes receiving signaling configuring the UE with a set of candidate cells; receiving, from a serving cell, downlink control information (DCI) indicating one candidate cell of the set of candidate cells as a target cell for transmitting a physical random access channel (PRACH); and transmitting the PRACH in the target cell.

Another aspect provides a method of wireless communication by a network entity. The method includes transmitting signaling configuring a UE with a set of candidate cells; and transmitting DCI indicating one candidate cell of the set of candidate cells as a target cell for the UE to transmit a PRACH.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for cross-carrier PRACH triggering by DCI.

In a random access channel (RACH) procedure, a user equipment (UE) sends a first message referred to as a physical RACH (PRACH) preamble to a network entity (e.g., a base station) to synchronize a cell. Currently, PRACH triggering from the network entity can be only based on higher layer signaling (which may have large latency) or a physical downlink control channel (PDCCH) which does not support cross-carrier triggering.

In some cases, a primary cell (Pcell) may be changed to a new candidate Pcell, but a UE may not receive data or control information in the candidate Pcell. In such cases, timing adjustment may be required for the new candidate cell before a Pcell change. While PRACH transmissions are typically used to determine such timing adjustment, cross-carrier PRACH triggering, which would allow for timing adjustment in a candidate Pcell is not typically supported.

Aspects of the present disclosure, however, provide techniques for triggering PRACH transmission in a candidate cell for uplink (UL) timing via a downlink control information (DCI) from a serving cell. For example, a UE may be configured with a set of candidate cells and then receive DCI from a serving cell, indicating one of the candidate cells as a target cell for transmitting a PRACH. The techniques disclosed herein may significantly reduce latency associated with PRACH triggering while enabling cross-carrier PRACH triggering in layer 1 (L1) and layer 2 (L2) based mobility.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
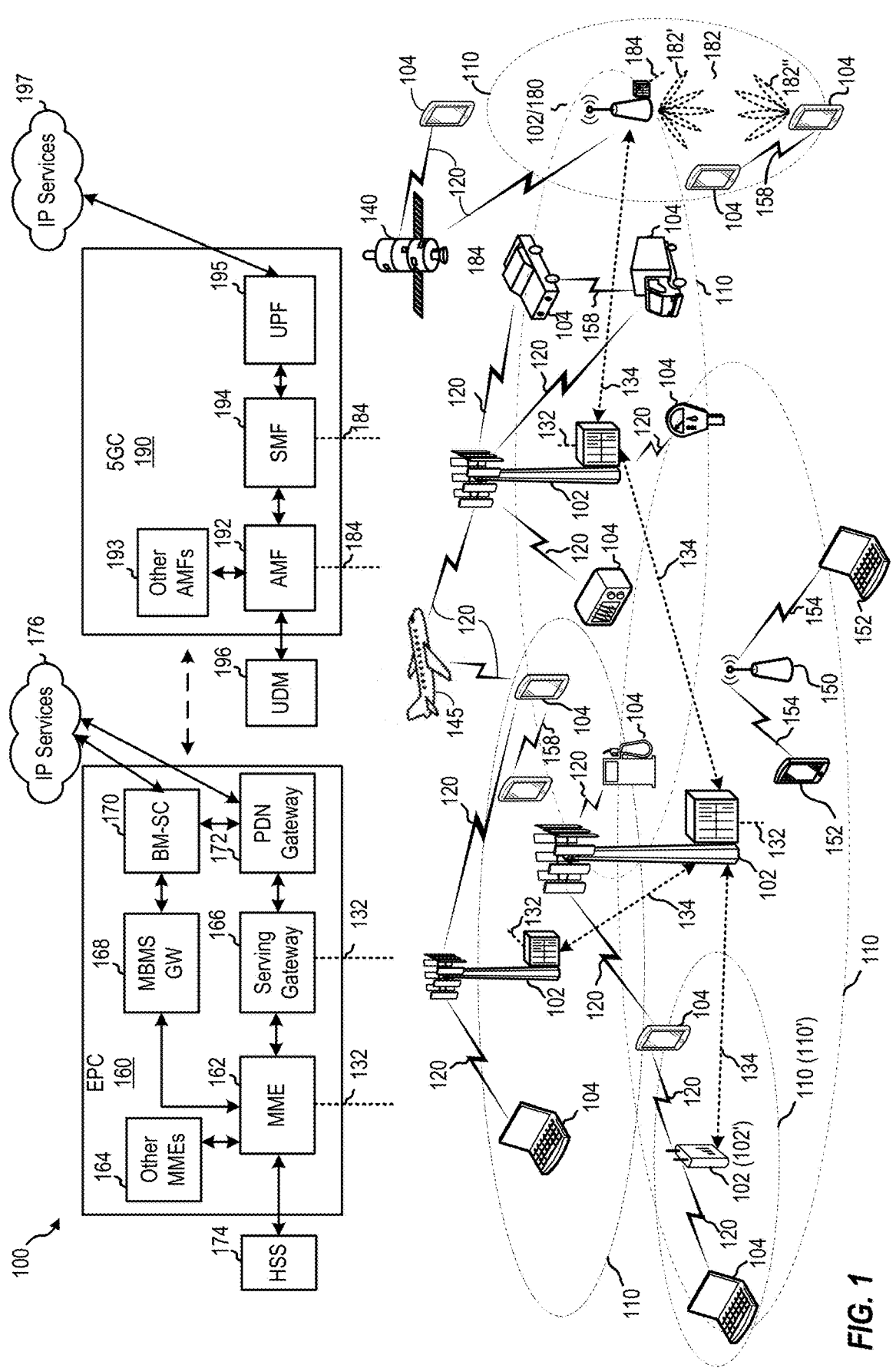
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
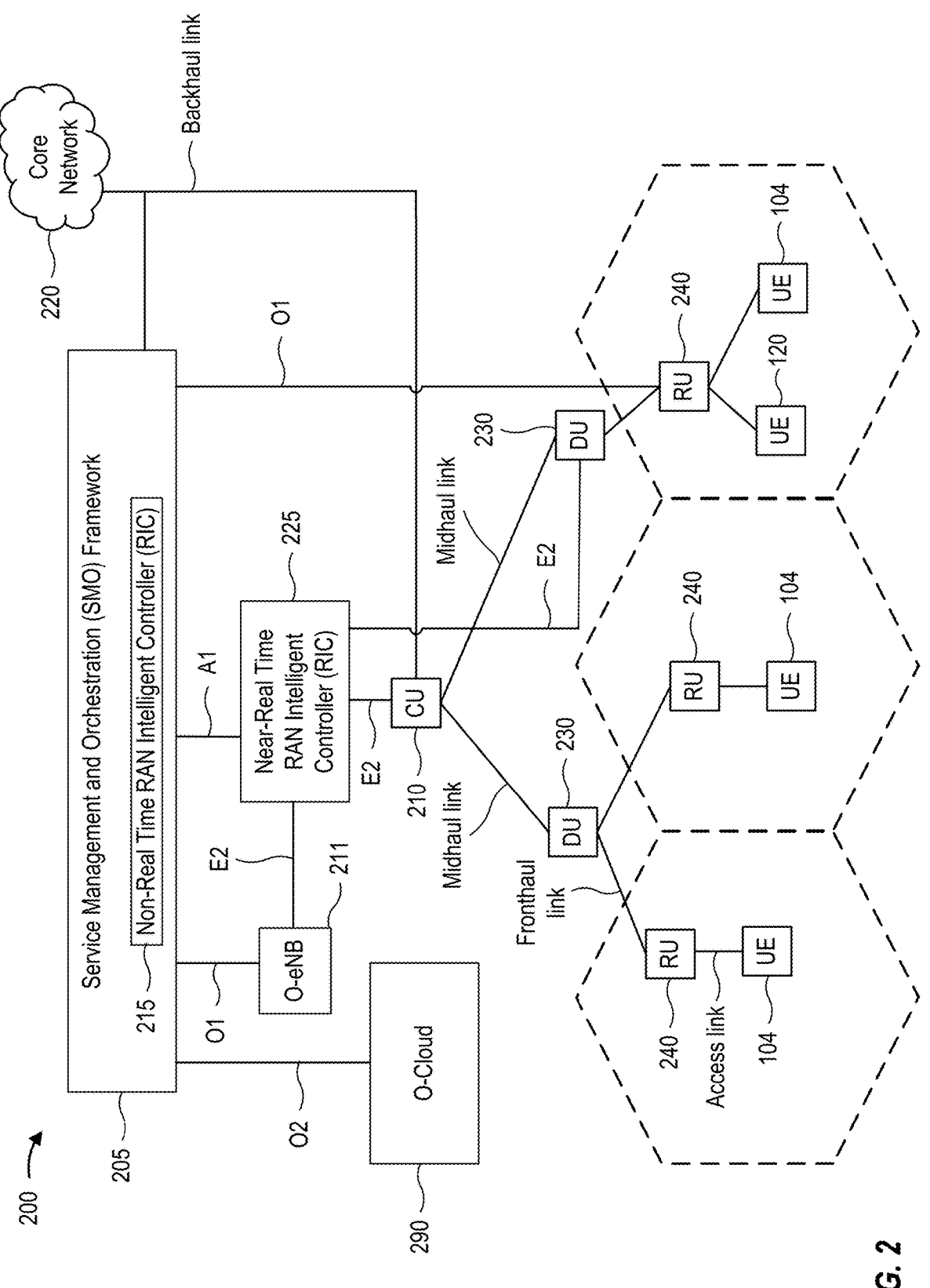
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
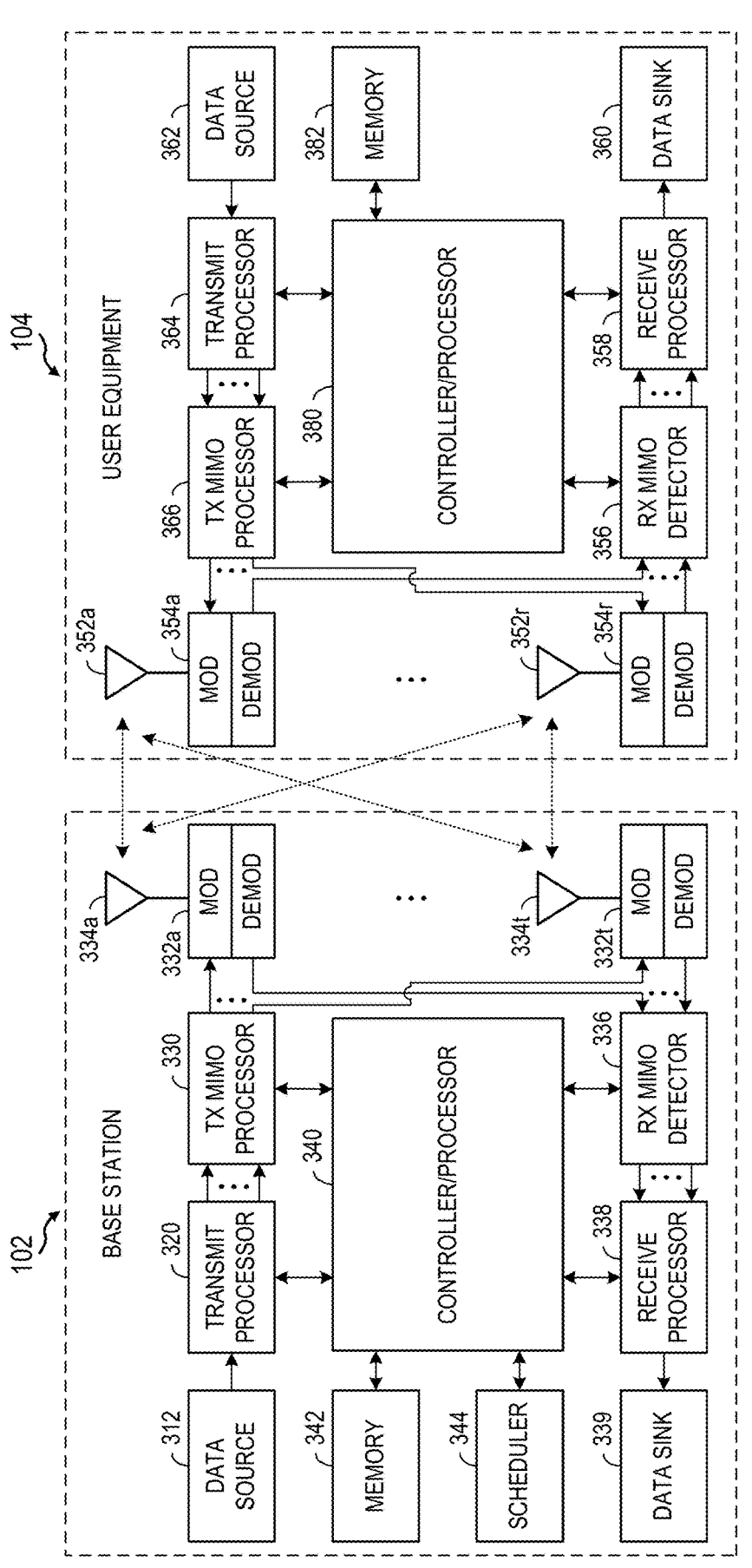
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
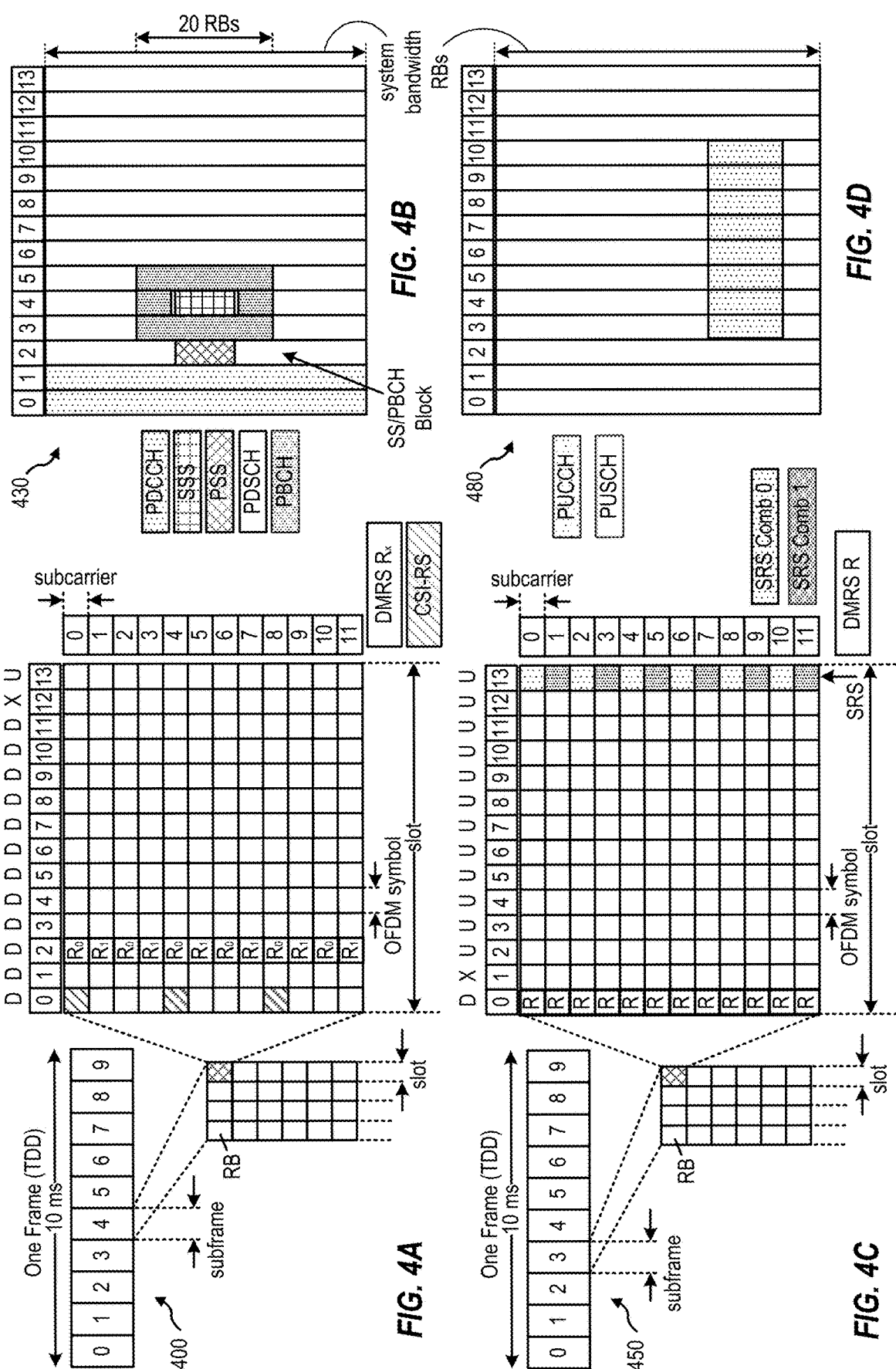
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of CA Cell Groups

In carrier aggregation (CA), cells may be divided into groups referred to as a master cell group (MCG) and a secondary cell group (SCG). A UE that supports dual connectivity (DC) may establish a connection with cells in both the MCG and SCG. The MCG may be a group that includes a cell in which the UE first initiates random access channel (RACH) procedure.

There may be many different types of cells under the MCG. One cell used for initial access is referred to as a primary cell (PCell). The PCell in the MCG and a secondary cell (SCell) in the MCG are effectively combined using CA. There is also a primary cell in the SCG, referred to as a PSCell, for which initial access is initiated under the SCG. The PSCell and SCell under the SCG may also be effectively combined through CA. Because most signaling messages are sent only on the PCell and PSCell, the protocol also defines a concept a special cell (SpCell), which refers to the PCell and PSCell.

Overview of Dynamic Signaling-Based Mobility

Dynamic mobility signaling (e.g., L1 and/or L2-centric mobility) may facilitate intra-cell and inter-cell mobility with reduced latency. The general concept of L1/L2 based mobility signaling may be described as follows.

A network may configure (e.g., via RRC signaling), a set of cells for L1/L2 mobility (referred to herein as an L1/L2 Mobility Configured cell set). At any given time, the network may also configure (via L1/L2 signaling) an L1/L2 Mobility Activated cell set, which refers to a group of cells in the configured set that are activated and can be readily be used for data and control transfer. The network may also configure (signal) an L1/L2 Mobility Deactivated cell set, which refers to a group of cells in in the configured set that are deactivated and can be readily be activated by L1/L2 signaling.

L1/L2 signaling may be used for mobility management of the activated set. For example, L1/L2 signaling may be used to activate/deactivate cells in the set, select beams within the activated cells, and update/switch a PCell. This dynamic signaling may help provide seamless mobility within the activated cells in the set. In other words, as the UE moves, the cells from the set are deactivated and activated by L1/L2 signaling. The cells to activate and deactivate may be based on various factors, such as signal quality (measurements) and loading.

In some cases, all cells in the L1/L2 Mobility Configured cell set may belong to the same DU. This may be similar to carrier aggregation (CA), but cells may be on the same carrier frequencies. The size of the cell set configured for L1/L2 mobility signaling may vary. In general, the cell set size may be selected to be large enough to cover a meaningful mobility area.

In some cases, the UE may be provided with a subset of deactivated cells, as a candidate cell set, from which the UE could autonomously choose to add to the activated cell set. The decision of whether to add a cell from the candidate cell set to the activated cell set may be a based various factors, such as measured channel quality and loading information. In some cases, the ability for the UE to autonomously choose to add to the activated cell set may be similar to a UE decision when configured for Conditional Handover (CHO) for fast and efficient addition of the prepared cells.

For primary cell (PCell) management, L1/L2 signaling may be used to set (select) the PCell out of the preconfigured options within the activated cell set. In some cases, L3 mobility may be used for PCell change (L3 handover) when a new PCell is not from the activated cell set for L1/L2 mobility. In such cases, RRC signaling may update the set of cells for L1/L2 mobility at L3 handover.

In some cases, physical layer (Layer 1 or L1) measurement may be enhanced for L1/L2 mobility, where a serving cell can be changed via L1/L2 signaling based on L1 measurement, and both synchronous and asynchronous source and target cells may be considered.

Various mechanisms and procedures of L1/L2 based inter-cell mobility may be specified for mobility latency reduction. These may include configuration and maintenance for multiple candidate cells to allow fast application of configurations for candidate cells. Dynamic switching mechanisms among candidate serving cells (including SpCell and SCell) may be supported for potential applicable scenarios based on L1/L2 signaling.

L1 enhancements for inter-cell beam management, may include L1 measurement and reporting, as well as beam indication. Timing Advance (TA) management and CU-DU interface signaling may also be provided to support L1/L2 mobility.

L1/L2 based inter-cell mobility procedures may be applicable to a variety of scenarios. These scenarios may include standalone, CA and new radio-dual connectivity (NR-DC) cases with serving cell change within one cell group (CG), intra-distributed unit (DU) cases and intra-central unit (CU) inter-DU cases, intra-frequency and inter-frequency scenarios, both FR1 and FR2 scenarios, and scenarios where source and target cells may be synchronized or non-synchronized.

Aspects Related to Cross-Carrier PRACH Triggering by DCI

As noted above, PRACH triggering from the network entity is typically based on higher layer signaling, which suffers from large latency, or via a PDCCH which does not support cross-carrier triggering.

Aspects of the present disclosure, however, provide techniques for triggering PRACH transmission in a candidate cell for uplink (UL) timing via a downlink control information (DCI) from a serving cell. This may be beneficial in cases where a primary cell (Pcell) may be changed to a new candidate Pcell, but a UE may not receive data or control information in the candidate Pcell. Aspects of the present disclosure may facilitate timing adjustment for the new candidate cell before a Pcell change.

The techniques presented herein may help facilitate timing adjustment for a variety of different cell selection scenarios. For example, the techniques may be utilized in an individual cell selection scenario (referred to as Class 1) illustrated in FIG. 5, with separate signaling for a PCell change and SCell change in case of CA. In some cases, beam indication may be based on PCell selection. SCell selection can be based on conventional (legacy) signaling or new L1/L2 signaling.

Figure 5:
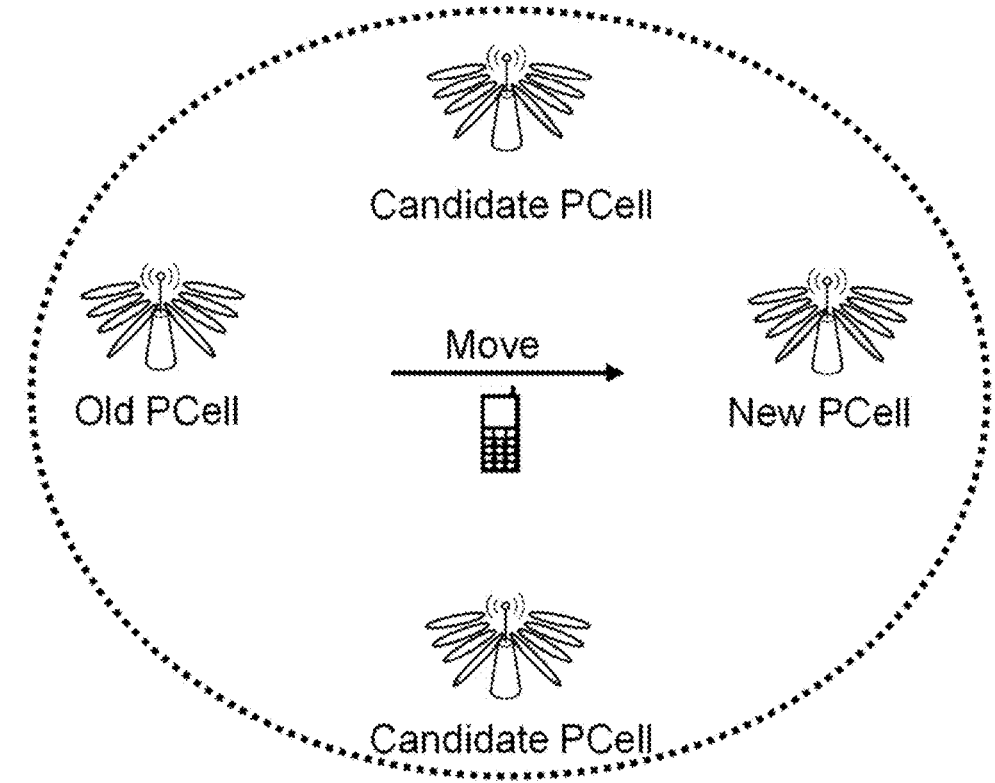
FIG. 5 depicts a scenario with a pre-configured candidate primary cell (PCell) set.

The example in FIG. 5 assumes a single PCell (as a UE moves from an Old PCell to a New PCell) without CA/DC is selected among pre-configured candidate PCell set. The techniques presented herein may also be used in the scenario shown in FIG. 6, where a PCell change occurs via a Pcell-to-SCell swap among a pre-configured candidate PCell set.

Figure 6:
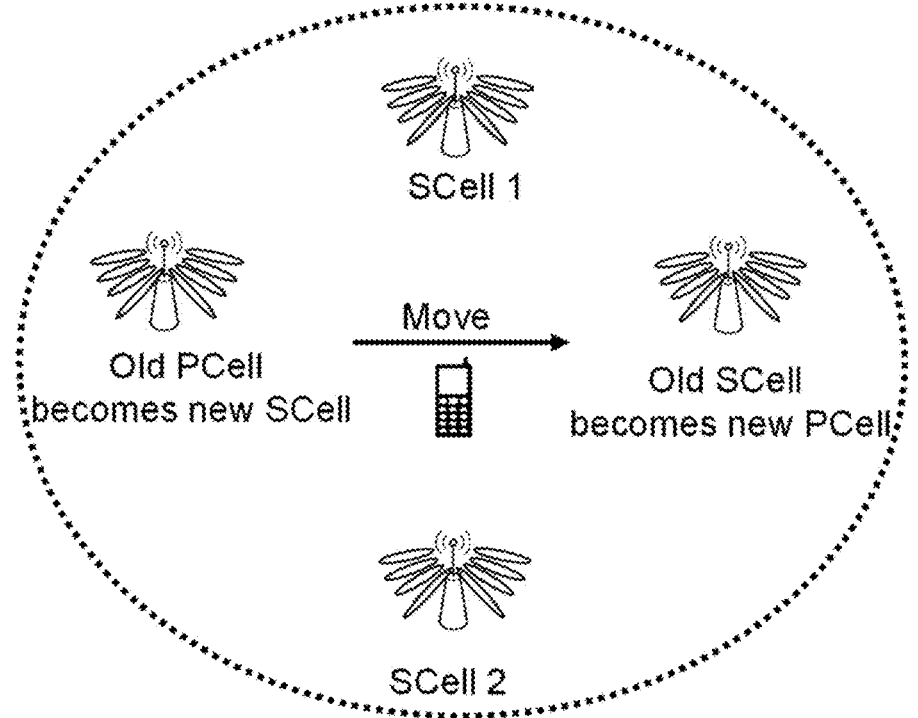
FIG. 6 depicts another selection scenario with a pre-configured candidate PCell set.
Figure 7:
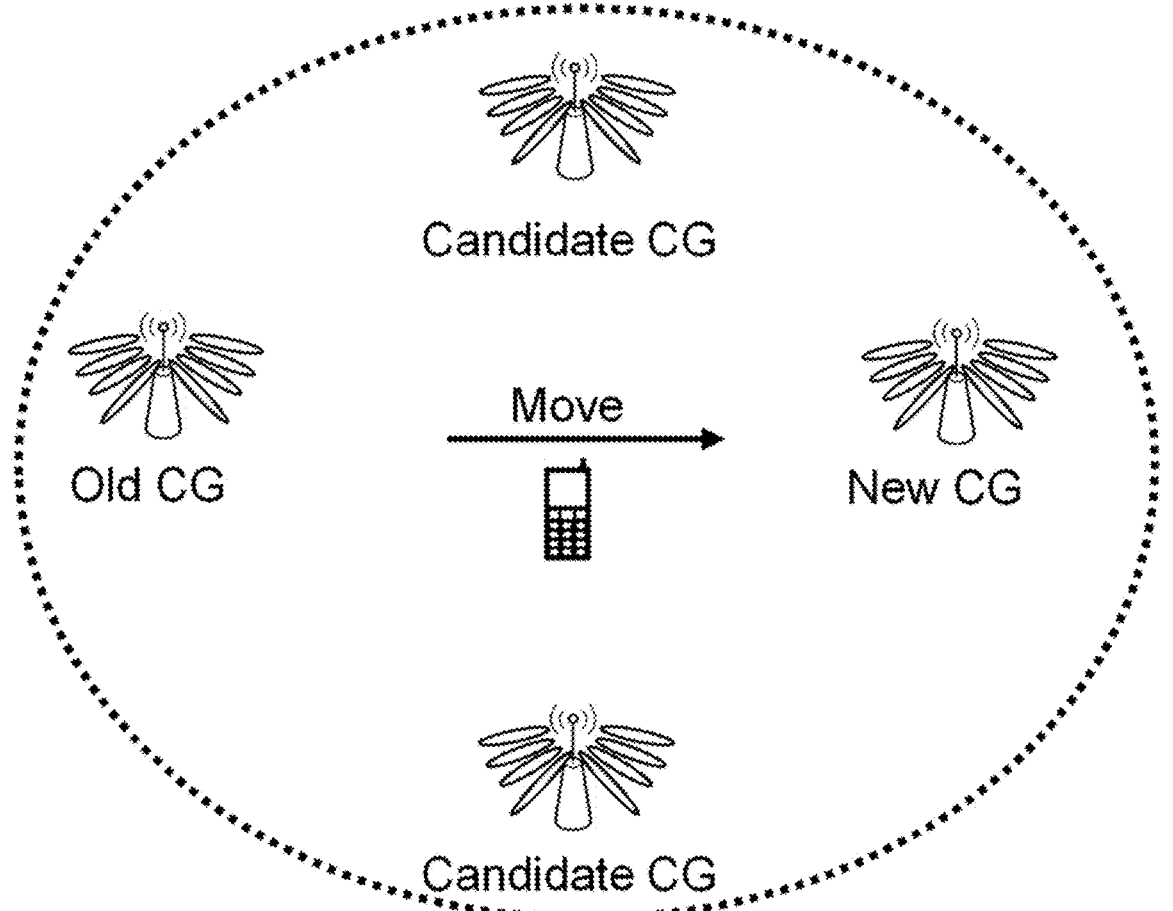
FIG. 7 depicts a scenario with a pre-configured candidate cell group (CG) set.

The techniques presented herein may also be used in the scenario shown in FIG. 7, for cell group (CG) based selection (referred to as Class 2). In this case, an SpCell and SCell may be switched together in case of CA. CG switch signaling can be based on an extension of signaling for the Class 1 scenarios shown in FIG. 5 and FIG. 6.

As noted above, there is typically no mechanism for triggering PRACH on another cell. This is because there is no cell identifier (ID) indicated in a triggering downlink control information (DCI) typically used to trigger a PRACH. Thus, timing adjustment for the cell selection scenarios shown in FIGS. 5-7 present an issue.

Figure 8:
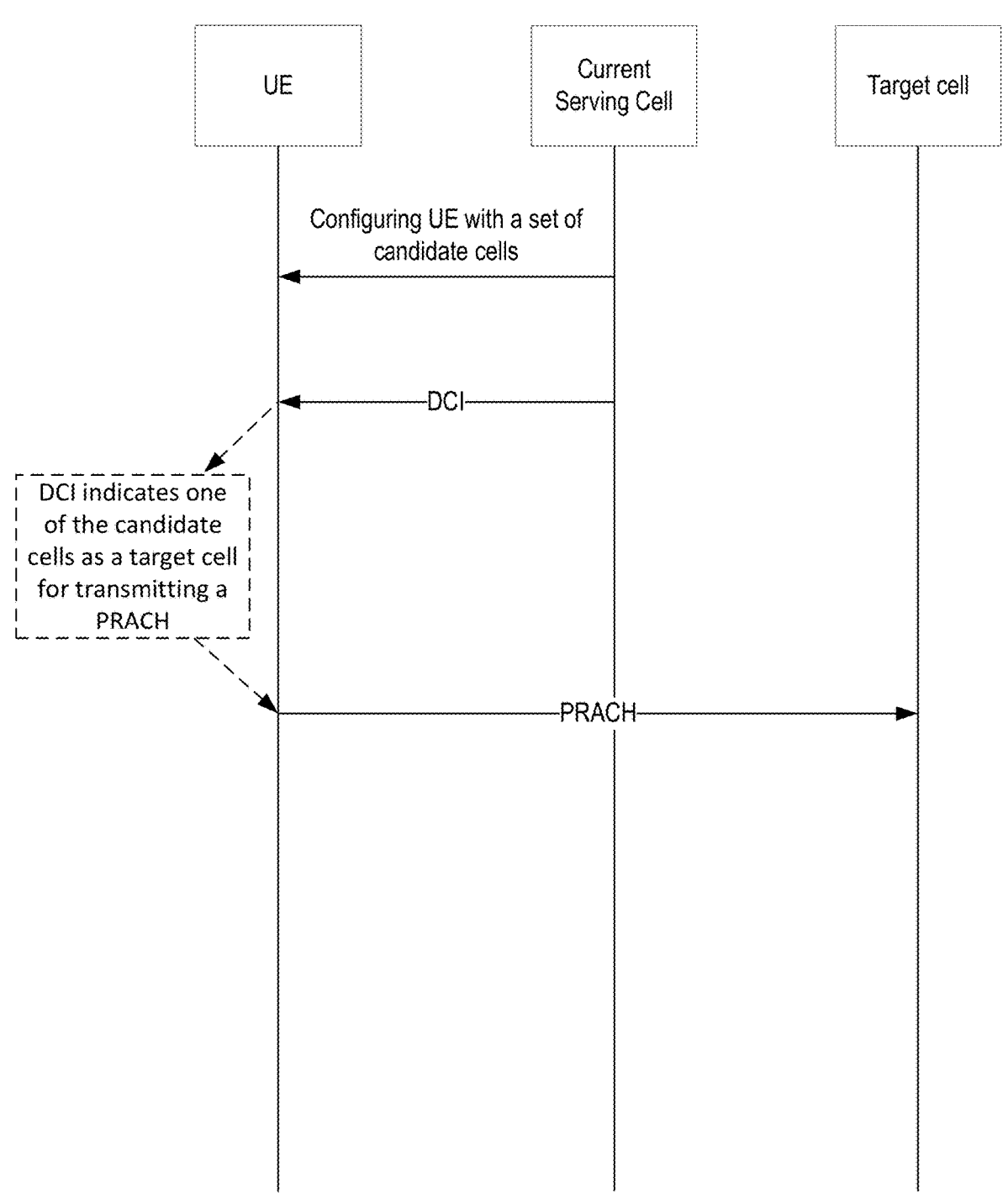
FIG. 8 depicts a call flow diagram illustrating cross-carrier physical random access channel (PRACH) triggering, in accordance with aspects of the present disclosure.

The techniques presented herein, for triggering cross-CC PRACH transmission, may be understood with reference to the call flow diagram 800 of FIG. 8.

As illustrated, a UE may be configured, by a current serving cell, with a set of candidate cells. The current serving cell may trigger the UE to transmit a PRACH on a target cell. For example, the current serving cell may trigger the PRACH transmission by sending a DCI that indicates one of the candidate cells as the target cell for transmitting the PRACH. In response, the UE may transmit the PRACH to the target cell.

Figure 9:
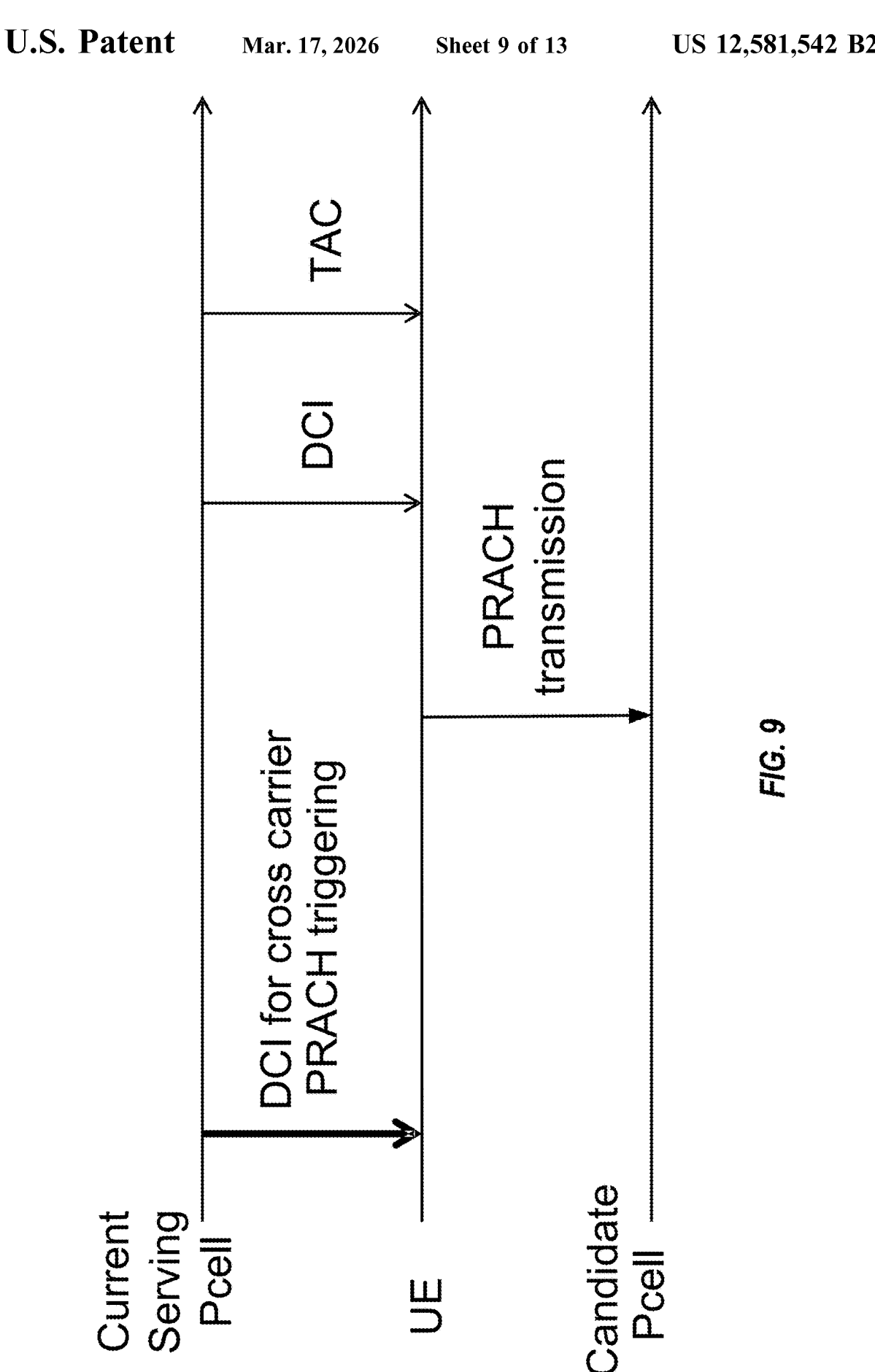
FIG. 9 depicts an example of cross-carrier PRACH triggering by DCI, in accordance with aspects of the present disclosure.

FIG. 9 illustrates an example timeline for a cross-CC PRACH transmission triggered via a DCI. As illustrated, a PCell orders a PRACH transmission in a candidate cell, via a DCI. In response, the UE transmits the PRACH transmission to the candidate cell. The network may then determine a timing adjustment (TA) value and provide the value to the UE, via a TA command (TAC). The UE may then apply this TA value when communicating in the candidate cell.

In this manner, when a UE is configured with a set of candidate cells for Pcell change purposes, via L1 and L2 based mobility, the UE may triggered, via a PDCCH in a serving cell, to transmit a PRACH in one of candidate cells. In some cases, an ID for the target candidate Pcell may be included in the DCI (e.g., using DCI format 1_0) for triggering PRACH from a serving cell.

In other cases, a different DCI format (e.g., DCI format 1_1) may be configured with a carrier indicator field (CIF)

field to trigger a PRACH from a serving cell. In such cases, the candidate Pcell may be associated with one CIF value in DCI format 1_1.

In some cases, if a cyclic redundancy check (CRC) of the DCI format 1_1 with the CIF field is scrambled by a cell radio network temporary identifier (C-RNTI) and the bits of a frequency domain resource assignment (FDRA) field are set to all ones, this may be an indication that the DCI format 1_1 is for a random access procedure initiated by a PDCCH order. This approach may be applied, for example, when the UE does not receive PDCCH and physical downlink shared channel (PDSCH) transmissions in a candidate Pcell.

The target Pcell for PRACH transmission may be associated with the CIF value indicated in the CIF field. For example, a candidate Pcell index may have X bits, according to the size of a candidate Pcell set. For example, if there are two candidate Pcells in the set, the value of X may be 1.

In some cases, if the CRC of the DCI format 1_1 with CIF field is scrambled by C-RNTI and the FDRA field is set to all ones, the DCI format 1_1 may be for a random access procedure initiated by a PDCCH order where the target Pcell for the random access transmission may be associated with the CIF value indicated in the CIF field.

Example Operations of a User Equipment

Figure 10:
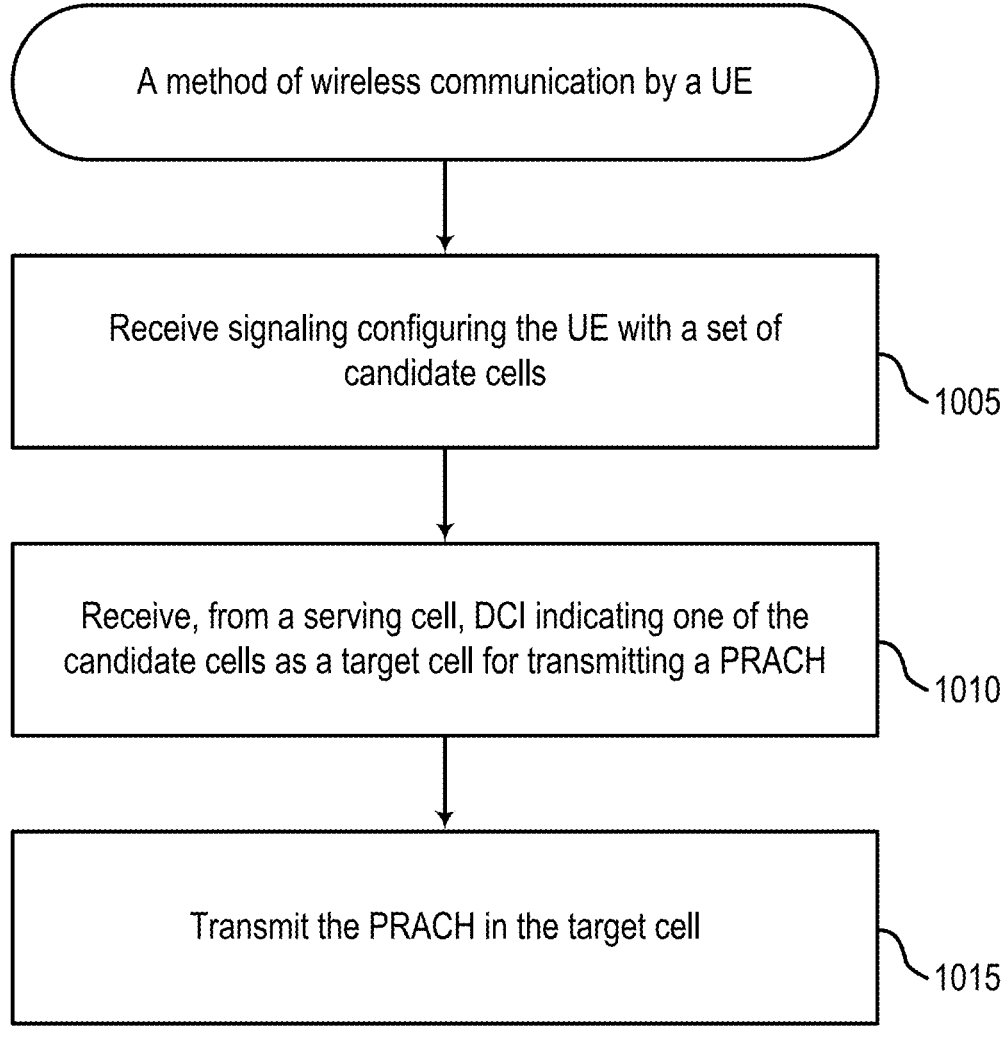
FIG. 10 depicts a method for wireless communications.

FIG. 10 shows an example of a method 1000 of wireless communication by a UE by a UE, such as UE 104 of FIGS. 1 and 3.

Method 1000 begins at step 1005 with receiving signaling configuring the UE with a set of candidate cells. In some cases, the operations of this step refer to, or may be performed by, circuitry for receiving and/or code for receiving as described with reference to FIG. 12.

Method 1000 then proceeds to step 1010 with receiving, from a serving cell, DCI indicating one of the candidate cells as a target cell for transmitting a PRACH. In some cases, the operations of this step refer to, or may be performed by, circuitry for receiving and/or code for receiving as described with reference to FIG. 12.

Method 1000 then proceeds to step 1015 with transmitting the PRACH in the target cell. In some cases, the operations of this step refer to, or may be performed by, circuitry for transmitting and/or code for transmitting as described with reference to FIG. 12.

In some aspects, the set of candidate cells support mobility signaling via PHY layer or MAC layer signaling.

In some aspects, the method 1000 further includes receiving, from the serving cell, a TA command to apply in the target cell. In some cases, the operations of this step refer to, or may be performed by, circuitry for receiving and/or code for receiving as described with reference to FIG. 12.

In some aspects, the DCI indicates the target cell by including an ID of the candidate cell.

In some aspects, the ID is included in a candidate Pcell index field of the DCI.

In some aspects, the DCI indicates the target cell via a CIF.

In some aspects, a value of the CIF is associated with the target cell.

In some aspects, the DCI indicates the value of the CIF is associated with the target cell if: a CRC of the DCI is scrambled with a certain RNTI; and bits of a FDRA field of the DCI are set to certain values.

Figure 12:
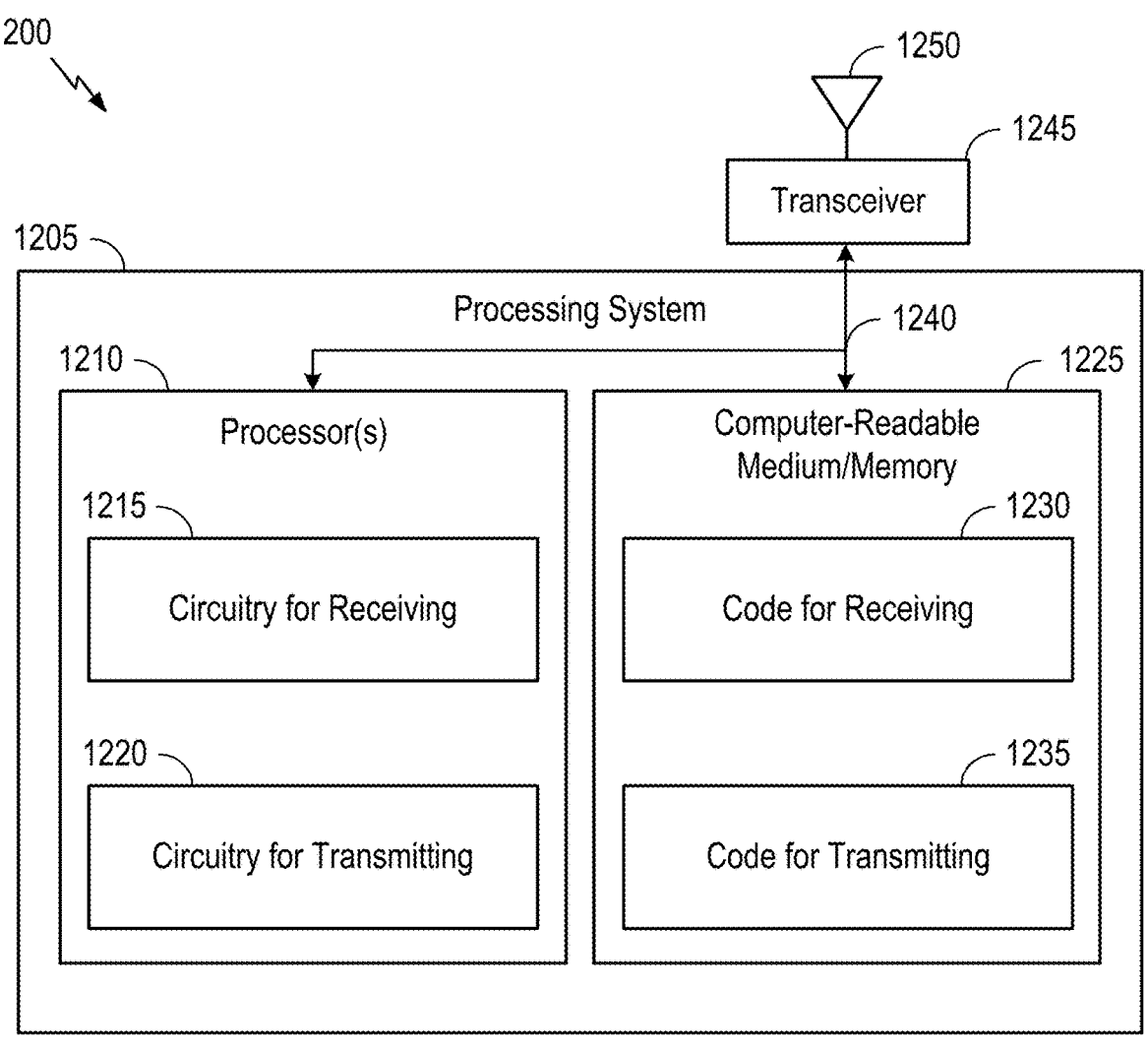
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Operations of a Network Entity

Figure 11:
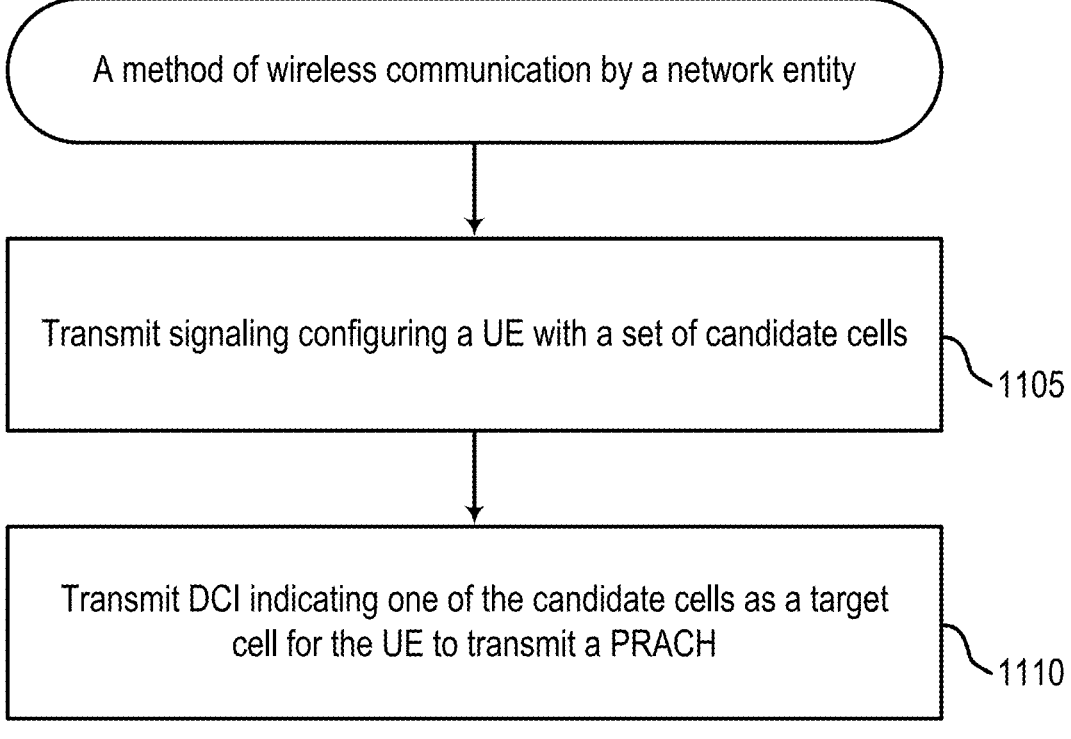
FIG. 11 depicts a method for wireless communications.

FIG. 11 shows an example of a method 1100 of wireless communication by a network entity, such as BS 102 of FIGS. 1 and 3, or a disaggregated base station as discussed with respect to FIG. 2.

Method 1100 begins at step 1105 with transmitting signaling configuring a UE with a set of candidate cells. In some cases, the operations of this step refer to, or may be performed by, circuitry for transmitting and/or code for transmitting as described with reference to FIG. 13.

Method 1100 then proceeds to step 1110 with transmitting DCI indicating one of the candidate cells as a target cell for the UE to transmit a PRACH. In some cases, the operations of this step refer to, or may be performed by, circuitry for transmitting and/or code for transmitting as described with reference to FIG. 13.

In some aspects, the set of candidate cells support mobility signaling via PHY layer or MAC layer signaling.

In some aspects, the method 1100 further includes receiving, from the target cell, an indication of timing based on the PRACH transmission from the UE. In some cases, the operations of this step refer to, or may be performed by, circuitry for receiving and/or code for receiving as described with reference to FIG. 13.

In some aspects, the method 1100 further includes transmitting a TA command, based on the indication of timing, for the UE to apply in the target cell. In some cases, the operations of this step refer to, or may be performed by, circuitry for transmitting and/or code for transmitting as described with reference to FIG. 13.

In some aspects, the DCI indicates the target cell by including an ID of the candidate cell.

In some aspects, the ID is included in a candidate Pcell index field of the DCI.

In some aspects, the DCI indicates the target cell via a CIF.

In some aspects, a value of the CIF is associated with the target cell.

In some aspects, the DCI indicates the value of the CIF is associated with the target cell if: a CRC of the DCI is scrambled with a certain RNTI; and bits of a FDRA field of the DCI are set to certain values.

Figure 13:
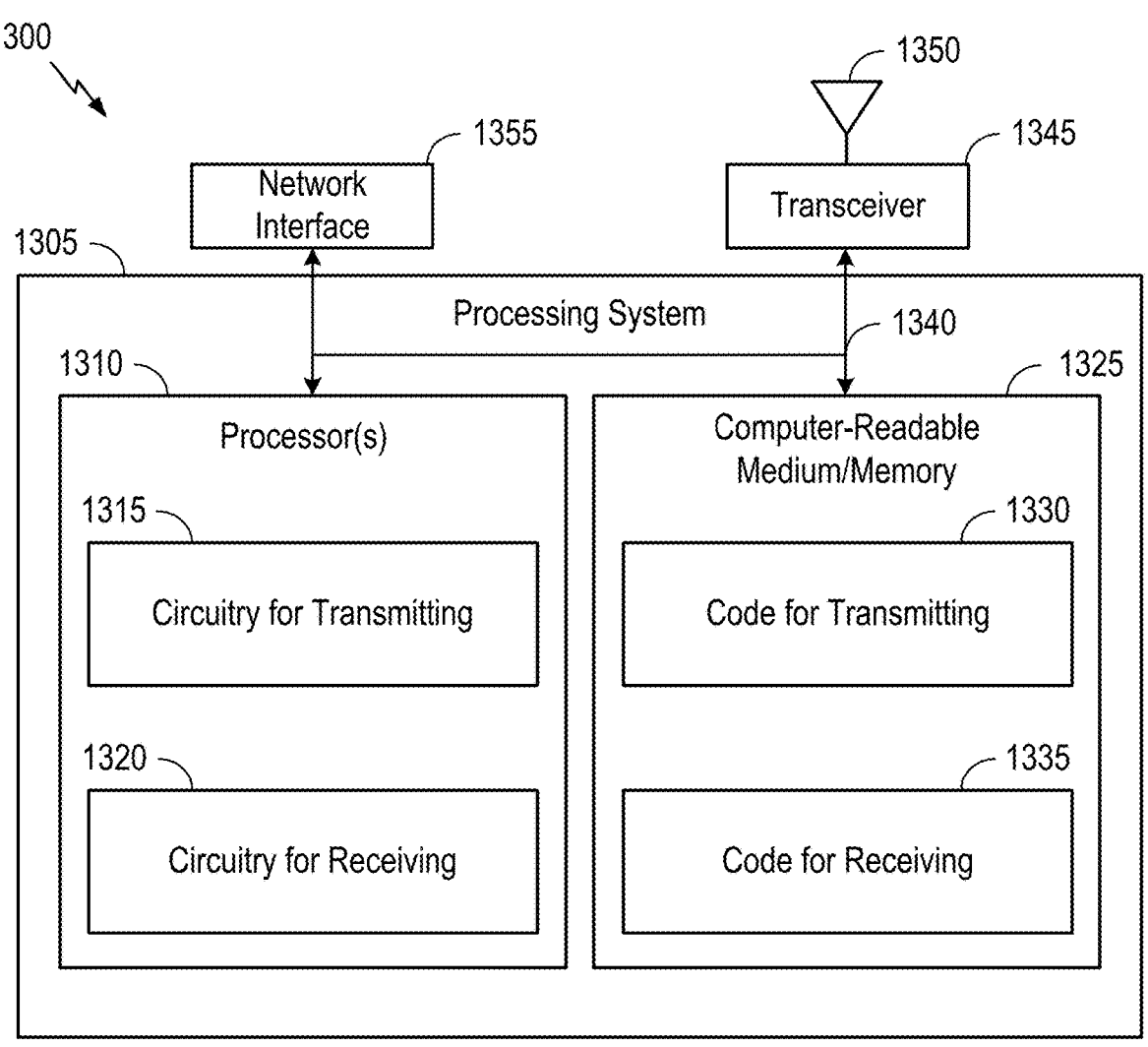
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a user equipment, such as UE 104 described above with respect to FIGS. 1 and 3.

The communications device 1200 includes a processing system 1205 coupled to the transceiver 1245 (e.g., a transmitter and/or a receiver). The transceiver 1245 is configured to transmit and receive signals for the communications device 1200 via the antenna 1250, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1225 via a bus 1240. In certain aspects, the computer-readable medium/ memory 1225 is configured to store instructions (e.g., computer-executable code) that when executed by the one or more processors 1210, cause the one or more processors 1210 to perform the method 1000 described with respect to FIG. 10, or any aspect related to it. Note that reference to a processor performing a function of communications device 1200 may include one or more processors 1210 performing that function of communications device 1200.

In the depicted example, computer-readable medium/ memory 1225 stores code (e.g., executable instructions), such as code for receiving 1230 and code for transmitting 1235. Processing of the code for receiving 1230 and code for transmitting 1235 may cause the communications device 1200 to perform the method 1000 described with respect to FIG. 10, or any aspect related to it.

The one or more processors 1210 include circuitry configured to implement (e.g., execute) the code stored in the computer-readable medium/memory 1225, including circuitry such as circuitry for receiving 1215 and circuitry for transmitting 1220. Processing with circuitry for receiving 1215 and circuitry for transmitting 1220 may cause the communications device 1200 to perform the method 1000 described with respect to FIG. 10, or any aspect related to it.

Various components of the communications device 1200 may provide means for performing the method 1000 described with respect to FIG. 10, or any aspect related to it. For example, means for transmitting, sending or outputting for transmission may include transceivers 354 and/or antenna(s) 352 of the UE 104 illustrated in FIG. 3 and/or the transceiver 1245 and the antenna 1250 of the communications device 1200 in FIG. 12. Means for receiving or obtaining may include transceivers 354 and/or antenna(s) 352 of the UE 104 illustrated in FIG. 3 and/or the transceiver 1245 and the antenna 1250 of the communications device 1200 in FIG. 12.

FIG. 13 depicts aspects of an example communications device 1300. In some aspects, communications device 1300 is a network entity, such as BS 102 of FIGS. 1 and 3, or a disaggregated base station as discussed with respect to FIG. 2.

The communications device 1300 includes a processing system 1305 coupled to the transceiver 1345 (e.g., a transmitter and/or a receiver) and/or a network interface 1355. The transceiver 1345 is configured to transmit and receive signals for the communications device 1300 via the antenna 1350, such as the various signals as described herein. The network interface 1355 is configured to obtain and send signals for the communications device 1300 via communication link(s), such as a backhaul link, midhaul link, and/or fronthaul link as described herein, such as with respect to FIG. 2. The processing system 1305 may be configured to perform processing functions for the communications device 1300, including processing signals received and/or to be transmitted by the communications device 1300.

The processing system 1305 includes one or more processors 1310. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1325 via a bus 1340. In certain aspects, the computer-readable medium/ memory 1325 is configured to store instructions (e.g., computer-executable code) that when executed by the one or more processors 1310, cause the one or more processors 1310 to perform the method 1100 described with respect to FIG. 11, or any aspect related to it. Note that reference to a processor of communications device 1300 performing a function may include one or more processors 1310 of communications device 1300 performing that function.

In the depicted example, the computer-readable medium/ memory 1325 stores code (e.g., executable instructions), such as code for transmitting 1330 and code for receiving 1335. Processing of the code for transmitting 1330 and code for receiving 1335 may cause the communications device 1300 to perform the method 1100 described with respect to FIG. 11, or any aspect related to it.

The one or more processors 1310 include circuitry configured to implement (e.g., execute) the code stored in the computer-readable medium/memory 1325, including circuitry such as circuitry for transmitting 1315 and circuitry for receiving 1320. Processing with circuitry for transmitting 1315 and circuitry for receiving 1320 may cause the communications device 1300 to perform the method 1100 as described with respect to FIG. 11, or any aspect related to it.

Various components of the communications device 1300 may provide means for performing the method 1100 as described with respect to FIG. 11, or any aspect related to it. Means for transmitting, sending or outputting for transmission may include transceivers 332 and/or antenna(s) 334 of the BS 102 illustrated in FIG. 3 and/or the transceiver 1345 and the antenna 1350 of the communications device 1300 in FIG. 13. Means for receiving or obtaining may include transceivers 332 and/or antenna(s) 334 of the BS 102 illustrated in FIG. 3 and/or the transceiver 1345 and the antenna 1350 of the communications device 1300 in FIG. 13.

Example Clauses

Implementation examples are described in the following numbered clauses:

Clause 1: A method of wireless communication by a UE, comprising: receiving signaling configuring the UE with a set of candidate cells; receiving, from a serving cell, DCI indicating one candidate cell of the set of candidate cells as a target cell for transmitting a PRACH; and transmitting the PRACH in the target cell.

Clause 2: The method of Clause 1, wherein the set of candidate cells support mobility signaling via PHY layer or MAC layer signaling.

Clause 3: The method of any one of Clauses 1 and 2, further comprising: receiving, from the serving cell, a TA command to apply in the target cell.

Clause 4: The method of any one of Clauses 1-3, wherein the DCI indicates the target cell by including an ID of the candidate cell.

Clause 5: The method of Clause 4, wherein the ID is included in a candidate Pcell index field of the DCI.

Clause 6: The method of any one of Clauses 1-5, wherein the DCI indicates the target cell via a CIF.

Clause 7: The method of Clause 6, wherein a value of the CIF is associated with the target cell.

Clause 8: The method of Clause 7, wherein the DCI indicates the value of the CIF is associated with the target cell if: a CRC of the DCI is scrambled with a certain RNTI; and bits of a FDRA field of the DCI are set to certain values.

Clause 9: A method of wireless communication by a network entity, comprising: transmitting signaling configuring a UE with a set of candidate cells; and transmitting DCI indicating one candidate cell of the set of candidate cells as a target cell for the UE to transmit a PRACH.

Clause 10: The method of Clause 9, wherein the set of candidate cells support mobility signaling via PHY layer or MAC layer signaling.

Clause 11: The method of any one of Clauses 9 and 10, further comprising: receiving, from the target cell, an indication of timing based on the PRACH transmission from the UE. Some examples further include transmitting a TA command, based on the indication of timing, for the UE to apply in the target cell.

Clause 12: The method of any one of Clauses 9-11, wherein the DCI indicates the target cell by including an ID of the candidate cell.

Clause 13: The method of Clause 12, wherein the ID is included in a candidate Pcell index field of the DCI.

Clause 14: The method of any one of Clauses 9-13, wherein the DCI indicates the target cell via a CIF.

Clause 15: The method of Clause 14, wherein a value of the CIF is associated with the target cell.

Clause 16: The method of Clause 15, wherein the DCI indicates the value of the CIF is associated with the target cell if: a CRC of the DCI is scrambled with a certain RNTI; and bits of a FDRA field of the DCI are set to certain values.

Clause 17: An apparatus, comprising: a memory comprising executable instructions; and a processor configured to execute the executable instructions and cause the apparatus to perform a method in accordance with any one of Clauses 1-16.

Clause 18: An apparatus, comprising means for performing a method in accordance with any one of Clauses 1-16.

Clause 19: A non-transitory computer-readable medium comprising executable instructions that, when executed by a processor of an apparatus, cause the apparatus to perform a method in accordance with any one of Clauses 1-16.

Clause 20: A computer program product embodied on a computer-readable storage medium comprising code for performing a method in accordance with any one of Clauses 1-16.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a user equipment (UE), comprising:
   receiving signaling configuring the UE with a set of candidate cells;
   receiving, from a serving cell, downlink control information (DCI) configured for cross-carrier physical random access channel (PRACH) triggering, the DCI comprising a field indicating one candidate cell of the set of candidate cells as a target cell for transmitting a PRACH;
   transmitting the PRACH in the target cell; and
   receiving, from the serving cell, a timing adjustment (TA) command to apply in the target cell.

2. The method of claim 1, wherein the set of candidate cells support mobility signaling via physical (PHY) layer or medium access control (MAC) layer signaling.

3. The method of claim 1, wherein the field of the DCI indicates the target cell by including an identifier (ID) of the one candidate cell.

4. The method of claim 3, wherein the field comprises a candidate primary cell (Pcell) index field.

5. The method of claim 1, wherein the field comprises a carrier indicator field (CIF).

6. The method of claim 5, wherein a value of the CIF is associated with the target cell.

7. The method of claim 6, wherein the DCI indicates the value of the CIF is associated with the target cell if:
   a cyclic redundancy check (CRC) of the DCI is scrambled with a certain radio network temporary identifier (RNTI); and
   bits of a frequency domain resource assignment (FDRA) field of the DCI are set to certain values.

8. A method of wireless communication at a network entity, comprising:
   transmitting signaling configuring a user equipment (UE) with a set of candidate cells;
   transmitting downlink control information (DCI) configured for cross-carrier physical random access channel (PRACH) triggering, the DCI comprising a field indicating one candidate cell of the set of candidate cells as a target cell for the UE to transmit a PRACH;
   receiving, from the target cell, an indication of timing based on the PRACH; and
   transmitting a timing adjustment (TA) command, based on the indication of timing, for the UE to apply in the target cell.

9. The method of claim 8, wherein the set of candidate cells support mobility signaling via physical (PHY) layer or medium access control (MAC) layer signaling.

10. The method of claim 8, wherein the field of the DCI indicates the target cell by including an identifier (ID) of the one candidate cell.

11. The method of claim 10, wherein the field comprises a candidate primary cell (Pcell) index field of the DCI.

12. The method of claim 8, wherein the field comprises a carrier indicator field (CIF).

13. The method of claim 12, wherein a value of the CIF is associated with the target cell.

14. The method of claim 13, wherein the DCI indicates the value of the CIF is associated with the target cell if:
   a cyclic redundancy check (CRC) of the DCI is scrambled with a certain radio network temporary identifier (RNTI); and
   bits of a frequency domain resource assignment (FDRA) field of the DCI are set to certain values.

15. An apparatus for wireless communication at a user equipment (UE), comprising:
   at least one memory comprising instructions; and
   at least one processor configured to execute the instructions to cause the apparatus to:
      receive signaling configuring the UE with a set of candidate cells;
      receive, from a serving cell, downlink control information (DCI) configured for cross-carrier physical random access channel (PRACH) triggering, the DCI comprising a field indicating one candidate cell of the set of candidate cells as a target cell for transmitting a PRACH;
      transmit the PRACH in the target cell; and
      receive, from the serving cell, a timing adjustment (TA) command to apply in the target cell.

16. The apparatus of claim 15, wherein the set of candidate cells support mobility signaling via physical (PHY) layer or medium access control (MAC) layer signaling.

17. The apparatus of claim 15, wherein the field of the DCI indicates the target cell by including an identifier (ID) of the one candidate cell.

18. The apparatus of claim 17, wherein the field comprises a candidate primary cell (Pcell) index field of the DCI.

19. The apparatus of claim 15, wherein the field comprises a carrier indicator field (CIF).

20. The apparatus of claim 19, wherein a value of the CIF is associated with the target cell.

21. The apparatus of claim 20, wherein the DCI indicates the value of the CIF is associated with the target cell if:
   a cyclic redundancy check (CRC) of the DCI is scrambled with a certain radio network temporary identifier (RNTI); and
   bits of a frequency domain resource assignment (FDRA) field of the DCI are set to certain values.

22. An apparatus for wireless communication at a network entity, comprising:
   at least one memory comprising instructions; and
   at least one processor configured to execute the instructions to cause the apparatus to:
      transmit signaling configuring a user equipment (UE) with a set of candidate cells; and
      transmit downlink control information (DCI) configured for cross-carrier physical random access channel (PRACH) triggering, the DCI comprising a field indicating one candidate cell of the set of candidate cells as a target cell for the UE to transmit a PRACH;
      receive, from the target cell, an indication of timing based on the PRACH; and
      transmit a timing adjustment (TA) command, based on the indication of timing, for the UE to apply in the target cell.

23. The apparatus of claim 22, wherein the set of candidate cells support mobility signaling via physical (PHY) layer or medium access control (MAC) layer signaling.

24. The apparatus of claim 22, wherein the field of the DCI indicates the target cell by including an identifier (ID) of the one candidate cell.

25. The apparatus of claim 24, wherein the field comprises a candidate primary cell (Pcell) index field of the DCI.

26. The apparatus of claim 22, wherein the field comprises a carrier indicator field (CIF).

27. The apparatus of claim 26, wherein a value of the CIF is associated with the target cell.

28. The apparatus of claim 27, wherein the DCI indicates the value of the CIF is associated with the target cell if:

a cyclic redundancy check (CRC) of the DCI is scrambled with a certain radio network temporary identifier (RNTI); and bits of a frequency domain resource assignment (FDRA) field of the DCI are set to certain values.

\* \* \* \* \*